United States Patent
Stolz et al.

(10) Patent No.: US 10,024,162 B2
(45) Date of Patent: Jul. 17, 2018

(54) TURBINE DISK FATIGUE REJUVENATION

(71) Applicant: United Technologies Corporation, Hartford, CT (US)

(72) Inventors: D. Slade Stolz, Newington, CT (US); David Ulrich Furrer, Marlborough, CT (US); Samir V Patel, Rocky Hill, CT (US); Raymond C Benn, Madison, CT (US); Alan D Cetel, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 141 days.

(21) Appl. No.: 14/774,923

(22) PCT Filed: Dec. 30, 2013

(86) PCT No.: PCT/US2013/078185
§ 371 (c)(1),
(2) Date: Sep. 11, 2015

(87) PCT Pub. No.: WO2014/158281
PCT Pub. Date: Oct. 2, 2014

(65) Prior Publication Data
US 2016/0024925 A1  Jan. 28, 2016

Related U.S. Application Data

(60) Provisional application No. 61/782,126, filed on Mar. 14, 2013.

(51) Int. Cl.
*F01D 5/10* (2006.01)
*F01D 5/12* (2006.01)
(Continued)

(52) U.S. Cl.
CPC .............. *F01D 5/005* (2013.01); *B23P 6/002* (2013.01); *B23P 6/04* (2013.01); *B23P 6/045* (2013.01);
(Continued)

(58) Field of Classification Search
CPC ... F01D 5/005; F01D 5/12; F01D 5/02; F01D 5/3007; F05D 2240/20; F05D 2240/24;
(Continued)

(56) References Cited

U.S. PATENT DOCUMENTS 6,375,423 B1 * 4/2002 Roberts ................ B23P 15/006
29/889.1
6,375,429 B1 * 4/2002 Halila ...................... F01D 5/26
416/193 A
(Continued)

FOREIGN PATENT DOCUMENTS

EP    1454707 A1    9/2004
EP    2535520 A2    12/2012
(Continued)

OTHER PUBLICATIONS

Mahmoud H. Kawthar-Ali; Mechanical and Electrochemical Properties of Inconel Alloy 617 After Refurbishment Through Heat Treatment; Aug. 12, 2002; School of Mechanical and Manufacturing Engineering Dublin City University; pp. 1-127.*

*Primary Examiner* — Bayan Salone
(74) *Attorney, Agent, or Firm* — Bachman & LaPointe, P.C.

(57) ABSTRACT

A process for rejuvenating a turbine disk having a plurality of slots includes the steps of determining a depth of a damaged layer containing M23C6 carbide dissolution; and removing the damaged layer from the slots in accordance with the determined depth.

5 Claims, 1 Drawing Sheet

(51) Int. Cl.
  *F01D 5/14* (2006.01)
  *B23P 6/04* (2006.01)
  *B23P 6/00* (2006.01)
  *F01D 5/00* (2006.01)
  *F01D 5/02* (2006.01)
  *F01D 5/30* (2006.01)

(52) U.S. Cl.
  CPC .............. *F01D 5/02* (2013.01); *F01D 5/12* (2013.01); *F01D 5/3023* (2013.01); *F01D 5/3007* (2013.01); *F05D 2230/10* (2013.01); *F05D 2230/12* (2013.01); *F05D 2230/14* (2013.01); *F05D 2230/80* (2013.01); *F05D 2240/20* (2013.01); *Y10T 29/49318* (2015.01)

(58) Field of Classification Search
  CPC ............ F05D 2230/10; F05D 2230/12; F05D 2230/14; F05D 2230/80; B23P 6/002; B23P 6/04; B23P 6/045; Y10T 29/49318; Y10T 29/49316
  USPC .............................. 29/889, 889.1; 416/219 R
  See application file for complete search history.

(56) References Cited

U.S. PATENT DOCUMENTS

| | | | | |
|---|---|---|---|---|
| 6,551,032 | B1* | 4/2003 | Nolan | B23D 37/22 407/13 |
| 6,676,336 | B2* | 1/2004 | Nolan | B23D 37/22 407/13 |
| 6,745,622 | B2 | 6/2004 | Smith et al. | |
| 6,780,089 | B2 | 8/2004 | Pan et al. | |
| 7,007,382 | B2* | 3/2006 | Mantel | B24B 19/02 29/557 |
| 8,182,229 | B2* | 5/2012 | Rajarajan | B23P 6/002 416/220 R |
| 8,209,845 | B2* | 7/2012 | Bhowal | B23P 6/002 148/405 |
| 8,266,800 | B2* | 9/2012 | Segletes | F01D 5/005 29/402.06 |
| 8,602,738 | B2* | 12/2013 | Rajarajan | B23P 6/002 29/889.1 |
| 8,813,331 | B2* | 8/2014 | Dimmick, III | F01D 5/005 29/402.01 |
| 8,906,221 | B2* | 12/2014 | Holmes | B23H 5/08 205/662 |
| 8,959,738 | B2* | 2/2015 | Hathiwala | B23P 6/005 29/281.1 |
| 2003/0091399 | A1 | 5/2003 | Nolan et al. | |
| 2005/0220624 | A1 | 10/2005 | Tipton et al. | |
| 2009/0057275 | A1 | 3/2009 | Chen et al. | |
| 2010/0126635 | A1* | 5/2010 | Bhowal | B24B 19/14 148/405 |
| 2011/0150636 | A1* | 6/2011 | Tholen | B23P 6/007 415/173.1 |
| 2011/0300779 | A1* | 12/2011 | Talarico | B24C 1/08 451/38 |
| 2012/0237349 | A1* | 9/2012 | Rajarajan | B23P 6/045 416/219 R |
| 2012/0251327 | A1* | 10/2012 | Dimmick, III | F01D 5/005 416/219 R |
| 2012/0315179 | A1* | 12/2012 | Bhowal | B24B 19/14 420/8 |

FOREIGN PATENT DOCUMENTS

| | | |
|---|---|---|
| JP | H09257788 A | 10/1997 |
| JP | 2011179878 A | 9/2011 |

* cited by examiner

TURBINE DISK FATIGUE REJUVENATION

BACKGROUND

The present disclosure is directed to a process for rejuvenating turbine disks.

Turbine disks can be fatigue limited in high temperature dwell environments due to initiation of fatigue cracks at the oxide surface. Turbine disks are typically made from nickel-based superalloys. One cause of fatigue life debit is microstructural dissolution near the oxide layer. Dissolution of M23C6 carbides near the surface is a prime driver in the fatigue failures.

It is desirable to find a way to recover the life of these turbine disks.

SUMMARY

In accordance with the present disclosure, there is provided a process for rejuvenating a turbine disk having a plurality of slots which broadly comprises the steps of determining a depth of a damaged layer containing M23C6 carbide dissolution; and removing the damaged layer from the slots in accordance with the determined depth.

In another and alternative embodiment, the determining step comprises creating a model showing the depth of M23C6 carbide dissolution vs. time and temperature.

In another and alternative embodiment, the process further comprises removing blades/buckets having an original size from the slots.

In another and alternative embodiment, the removing step comprises remachining the slots.

In another and alternative embodiment, the remachining step comprises using one of super abrasive machining, wire EDM, broaching, grinding, and milling.

In another and alternative embodiment, the remachining step further comprises remachining other high temperature exposed surfaces.

In another and alternative embodiment, the process further comprises installing new blades/buckets into the remachined slots having a size larger than a size of removed blades/buckets.

Other details of the turbine disk fatigue rejuvenation are set forth in the following detailed description and the following drawings in which like reference numerals depict like elements.

DETAILED DESCRIPTION

Figure 1:
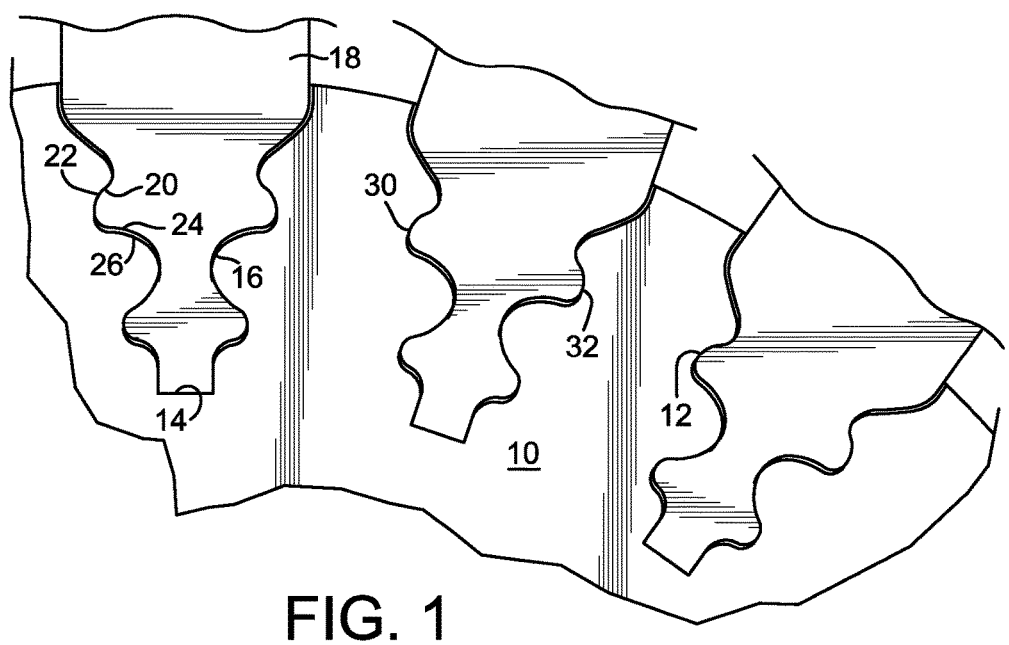
FIG. 1 is a schematic representation of a turbine disk.

Referring now to FIG. 1, there is shown a turbine disk 10 forming one of the disks of a gas or steam turbine. The turbine disk 10 may be formed from a nickel-based superalloy or an iron based alloy. The turbine disk 10 has a plurality of generally dovetail-shaped slots 12 spaced circumferentially one form the other about the periphery of the margin of the turbine disk 10. As illustrated, each slot 12 includes a slot bottom 14 and a plurality of ribs 16 along opposite slides of the slot 12 and progressively spaced greater distances from one another from the bottom of the slot 14 radially outward to its outermost opening.

A blade or bucket 18 having a generally corresponding dovetail shaped configuration at its root as the dovetail configuration of the slot 12 is disposed in each slot 12 about the rotor. It will be appreciated that when the rotor rotates, the outermost surfaces of the ribs 16 of the dovetail slot and those of the surfaces of the ribs 16 of the dovetail slot and those of the blade or bucket dovetails constitute active surfaces 20 and 22, respectively which tightly bear against one another. The opposing surfaces 24 and 26 of the slot and blade/bucket root, respectively, generally only lightly engage or are spaced relative to one another during operation of the turbine. Over time, the active surfaces wear and the disk requires refurbishment or overhaul.

Figure 2:
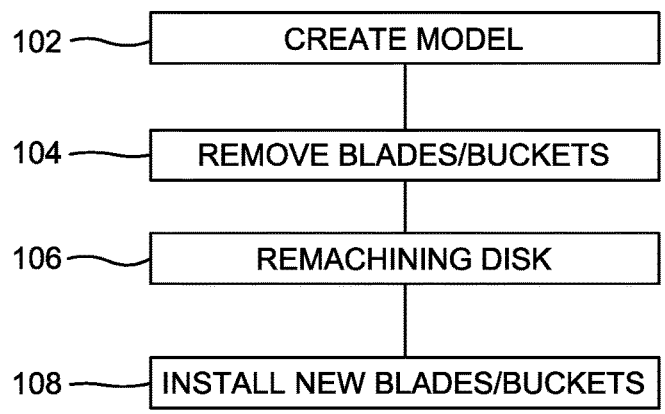
FIG. 2 is a flow chart showing the process for rejuvenating a turbine disk.

Referring now to FIG. 2, there is shown a flowchart showing a process for rejuvenating the turbine disk. In step 102, a model is first developed which shows the depth of M23C6 carbide dissolution versus time and temperature for the nickel-based superalloy or iron based alloy forming the turbine disk. The model allows an understanding of the amount of material that must be removed to eliminate any region of M23C6 carbide dissolution. The model may be created using a pre-programmed computer which shows the depth of M23C6 carbide dissolution versus time and temperature for the material forming the turbine disk.

In step 104, prior to remachining the turbine disk 10, the blades/buckets 18 are removed, leaving the bare slots 12.

In step 106, once it is understood how much material must be removed from the turbine disk 10 to eliminate any region of M23C6 carbide dissolution, the disk slots 12, as well as other high temperature exposed surfaces, are remachined to eliminate the unwanted regions of M23C6 carbide dissolution. The other high temperature exposed surfaces could be the outer rim or front face of the turbine disk 12. The remachining step may be performed using super abrasive machining, wire EDM, broaching, grinding, milling, etc. to remove the damaged layer. During the remachining, the surfaces of the slots 12 are transformed by removing the determined damaged layer while retaining the dovetail configuration.

Removal of the damaged layer increases the size of the slots 12. Thus, the replacement blades/buckets 18 must be larger in size than the original blades/buckets. For example, the replacement blades/buckets may have a larger root portion than the root portion of the original blades/buckets. Additionally, the replacement blades/buckets may be larger from tip 30 to tip 32 of each dovetail than the original blades/buckets. In step 108, the replacement blades/buckets 18 are installed.

The method described herein causes a substantial increase in dwell fatigue life, thereby increasing the service life of a turbine disk. Depending on the conditions, the fatigue debit associated with oxidation can be as much or more than two times the non-oxidized life.

There has been provided a turbine disk fatigue rejuvenation. While the turbine disk fatigue rejuvenation has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A process for rejuvenating a turbine disk having a plurality of slots comprising: determining a depth of a damaged layer containing M23C6 carbide dissolution; remachining said slots to remove said damaged layer from said slots in accordance with the determined depth; and installing new blades/buckets into said re-machined slots having a size larger than a size of removed blades/buckets.

2. The process of claim 1, wherein said determining step comprises creating a model showing the depth of M23C6 carbide dissolution vs. time and temperature.

3. The process of claim 1, further comprising removing blades/buckets having an original size from said slots.

4. The process of claim 1, wherein said re-machining comprises using one of super abrasive machining, wire EDM, broaching, grinding, and milling.

5. The process of claim 1, wherein said re-machining step further comprises re-machining other high temperature exposed surfaces.

\* \* \* \* \*